United States Patent
Hoover

(10) Patent No.: US 10,244,839 B1
(45) Date of Patent: Apr. 2, 2019

(54) CASE WITH INCREASED DEVICE RETENTION FROM A MICRO-TEXTURED LIP

(71) Applicant: Apple Inc., Cupertino, CA (US)

(72) Inventor: Joshua A. Hoover, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/494,207

(22) Filed: Apr. 21, 2017

Related U.S. Application Data

(60) Provisional application No. 62/397,245, filed on Sep. 20, 2016.

(51) Int. Cl.
| | | |
|---|---|---|
| *A45C 11/00* | (2006.01) | |
| *A45F 5/00* | (2006.01) | |
| *B29C 51/10* | (2006.01) | |
| *B29L 31/34* | (2006.01) | |

(52) U.S. Cl.
CPC .............. *A45C 11/00* (2013.01); *A45F 5/00* (2013.01); *A45C 2011/002* (2013.01); *A45C 2011/003* (2013.01); *B29C 51/10* (2013.01); *B29L 2031/3481* (2013.01)

(58) Field of Classification Search
CPC .............. A45C 11/00; A45C 2011/002; A45C 2011/003; A45F 5/00; B29C 51/10; B29L 2031/3481; B65D 85/38; H04M 1/18; H04M 1/185; H04M 1/3888
USPC ........................................ 206/320; 455/575.8
See application file for complete search history.

(56) References Cited

U.S. PATENT DOCUMENTS

| | | | | |
|---|---|---|---|---|
| 8,887,909 | B2 * | 11/2014 | McCarthy | A45C 11/00 206/320 |
| 9,462,099 | B2 * | 10/2016 | Wilson | H04M 1/185 |
| 9,614,569 | B2 * | 4/2017 | Alsberg | H04M 1/18 |
| 9,749,001 | B2 * | 8/2017 | Stryker | H04B 1/3888 |
| 10,165,838 | B2 * | 1/2019 | Corcoran | A45C 11/00 |

* cited by examiner

*Primary Examiner* — Bryon P Gehman
(74) *Attorney, Agent, or Firm* — Dickinson Wright RLLP

(57) ABSTRACT

According to some embodiments, a case for a portable electronic device is described. The case can include a bottom wall and side walls that cooperate to define a cavity having a size and shape suitable for accommodating the portable electronic device. The side walls can include an edge that defines an opening that leads to the cavity and that allows passage of the portable electronic device into the cavity. At least one of the side walls has a protrusion that extends at an angle into the cavity, and where the protrusion (i) allows insertion of the portable electronic device through the opening and into the cavity, and (ii) hinders movements of the portable electronic device out of the cavity.

20 Claims, 10 Drawing Sheets

CASE WITH INCREASED DEVICE RETENTION FROM A MICRO-TEXTURED LIP

CROSS-REFERENCE TO RELATED APPLICATION

The present application claims the benefit of U.S. Provisional Application No. 62/397,245, entitled "CASE WITH INCREASED DEVICE RETENTION FROM A MICRO-TEXTURED LIP" filed on Sep. 20, 2016, the contents of which are incorporated by reference in its entirety for all purposes.

FIELD

The described embodiments relate to a case for carrying a portable electronic device. Specifically, the case includes securing elements on a sidewall or corner portion of the case that are capable of preventing the portable electronic device from being forcefully extracted from the internal cavity when an external force is applied to the case.

BACKGROUND

Portable electronic devices can be carried by cases that can protect the portable electronic devices from being scratched or damaged. However, when the case is subjected to a large amount of force (e.g., drop event), the case is unable to prevent the portable electronic device from being forcefully extracted from an internal cavity of the case. Accordingly, there is a need for protective cases to include securing elements that prevent or minimize the forceful extraction of the portable electronic device from the case.

SUMMARY

This paper describes various embodiments related to a case for carrying a portable electronic device. Specifically, the case includes securing elements that extend from a sidewall or corner portion of the case and are capable of preventing the portable electronic device from being forcefully extracted from the case when the case is subjected to a large amount of external force.

According to some embodiments, a case for a portable electronic device is described. The case can include a bottom wall and side walls that cooperate to define a cavity having a size and shape suitable for accommodating the portable electronic device. The side walls can include an edge that defines an opening that leads to the cavity and that allows passage of the portable electronic device into the cavity. Furthermore, at least one of the side walls has a protrusion extending at an angle into the cavity, and where the protrusion (i) allows insertion of the portable electronic device through the opening and into the cavity, and (ii) hinders movement of the portable electronic device out of the cavity.

According to some embodiments, a molded shell for retaining a portable electronic device is described. The molded shell can include a bottom wall and side walls that cooperate to form a cavity with a width that is capable of accommodating the portable electronic device, where each of the side walls has an undercut cross section such that an upper edge of the side wall (i) is visible from an environment external to the bottom wall and the side walls, and (ii) defines an opening that leads to the cavity, and wherein the opening is less than the width of the cavity. Furthermore, the molded shell can include a protrusion that extends from an interior surface of at least one of the side walls in a direction towards the bottom wall, where the protrusion is capable of engaging an exterior surface of the portable electronic device carried by the bottom wall and the side walls within the cavity, and where the undercut cross section prevents the protrusion from being visible from the external environment.

According to some embodiments, a method for forming a case for an electronic device is described. The method includes shaping a substrate to form a bottom wall and side walls that extend from the bottom wall, where the side walls and the bottom wall define a cavity having a size and shape suitable for accommodating the electronic device, and the side walls have an edge that defines an opening that leads to the cavity and that allows passage of the electronic device into the cavity. The method further includes forming a protrusion along at least one of the side walls, where the protrusion extends at an angle into the cavity so as to (i) allow insertion of the electronic device through the opening and into the cavity, and (ii) prevent movement of the electronic device out of the cavity.

The described embodiments may be better understood by reference to the following description and the accompanying drawings. Additionally, advantages of the described embodiments may be better understood by reference to the following description and accompanying drawings.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
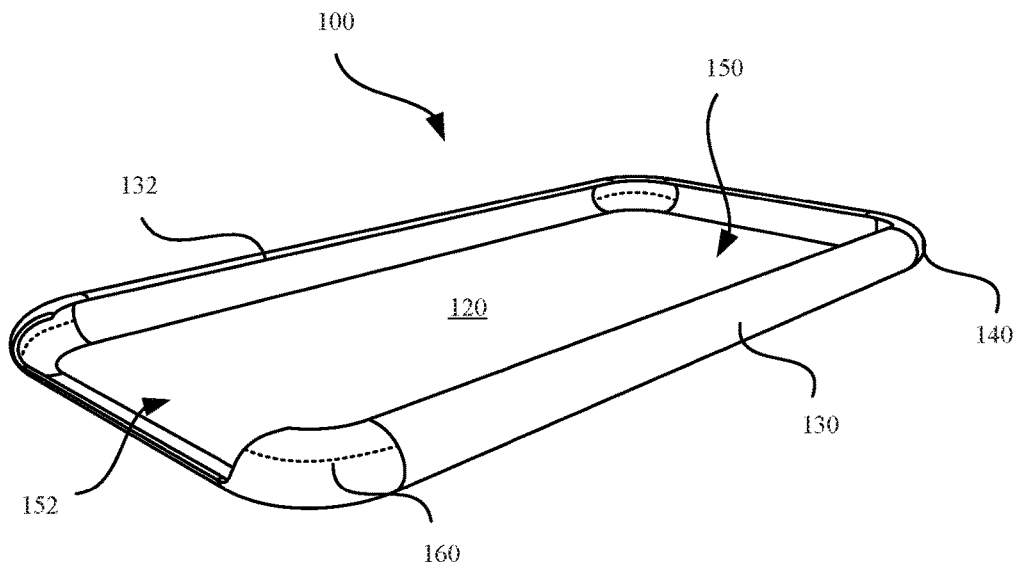
FIGS. 1A-1D illustrate perspective views of various embodiments of a case for a portable electronic device.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

The following disclosure describes various embodiments of a protective case for carrying a portable electronic device. Certain details are set forth in the following description and figures to provide a thorough understanding of various embodiments of the present technology. Moreover, various features, structures, and/or characteristics of the present technology can be combined in other suitable structures and environments. In other instances, well-known structures, materials, operations, and/or systems are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

Protective cases for electronic devices can include various protective features designed to minimize or prevent damage to the electronic devices carried by these cases. In some examples, the protective cases can include over-sized walls that wrap around the borders of the electronic device and function as a protective barrier. The protective barrier can prevent or minimize scratches or gouges to the surfaces of these electronic devices. Furthermore, the over-sized walls can be thickened to increase the amount of separation between the electronic device and the external environment so as to protect a portable electronic device that is carried by the case from being damaged when the case is subjected to a hard impact.

However, protective cases should not also obstruct or hinder user interaction with the various interface units (e.g., touchscreen display, buttons, etc.) of the electronic device. As such, many protective cases do not fully enclose the entire electronic device within a protective barrier. Additionally, the electronic device should also be relatively easy to insert within an interior cavity of the case or remove from the interior cavity of the case. Consider, in some examples, protective cases include three sidewalls to promote ease of insertion and/or removal of the electronic device from the case. Additionally, in some examples, the walls of the case can be comprised of relatively flexible or stretchy material that promote ease of insertion and/or removal of the electronic device from the cavity of the case. However, one of the disadvantages of a case having materials, or a structural design or configuration that promotes ease of insertion and/or removal of the electronic device is that the electronic device can also be more susceptible to becoming forcefully extracted from the case when the case is subjected to an external amount of force. Therefore, users may desire for protective cases to include additional protective features, such as securing elements that prevent unwanted extraction of the electronic device from the interior cavity of the case.

In some embodiments, the term "external amount of force" or "external force" refers to a force caused by external agents outside of the system (i.e., case carrying the electronic device). In some examples, the external amount of force can be directed towards the system from one or a combination of several different force vectors. In some examples, the external amount of force can be caused by, but is not limited to the following: dropping the system on a hard object (e.g., table or floor), striking the system with another object, throwing the system at a high velocity and/or acceleration, shaking the system with sufficient force, or dragging the system across another surface. In some examples, the "external force" can also refer to strain that is exerted against the system by an external agent.

In various embodiments, a case for a portable electronic device can include a bottom wall and side walls that cooperate to define a cavity having a size and shape suitable for accommodating the portable electronic device. The side walls can include an edge that defines an opening that leads to the cavity and that allows passage of the portable electronic device into the cavity. At least one of the side walls has a protrusion extending at an angle into the cavity, and where the protrusion (i) allows insertion of the portable electronic device through the opening and into the cavity, and (ii) hinders movement of the portable electronic device out of the cavity.

The various embodiments set forth herein are provided to prevent forceful extraction of an electronic device that is carried by a case. Exemplary electronic devices that can be carried by the case can include, but are not limited to portable computing devices, laptops, smartphones, smartwatches, mobile devices, consumer devices, wearable electronic devices, tablet computers, and the like.

The foregoing provides various protective cases for carrying portable electronic devices. A more detailed discussion of these cases is set forth below and described with reference to FIGS. 1-7, which illustrate detailed diagrams of cases and components that can be used to implement these techniques and features.

FIGS. 1A-1D illustrate perspective views of various embodiments of a case 100 that is configured to receive a portable electronic device. FIG. 1A illustrates a case 100 that includes sidewalls 130 that define an opening 152 from an external surface of the case 100 to an internal cavity 150 of the case 100, in accordance with some embodiments. The internal cavity 150 can have a size and shape that corresponds to a portable electronic device. In some examples, the portable electronic device can refer to a smartphone, a tablet computer, a computing device, a consumer device, a wearable accessory, or a digital media player.

In some examples, the case 100 can be manufactured from a generally flexible or deformable material. In some examples, the case 100 can be made from materials including at least one of silicone, polyurethane, elastomers, polyester, or any other type of moldable material. In this manner, the sidewalls 130 can be configured to flex and deform to facilitate easier insertion and extraction of the portable electronic device from the internal cavity 150. Additionally, the opening 152 provided between sidewalls 130 can facilitate in inserting the portable electronic device within the case 100. However, the presence of the opening 152 (and corresponding absence of a sidewall) can also make it more likely that the portable electronic device can become forcefully and unintentionally extracted from the case 100 when the case 100 is subject to a hard impact.

In some embodiments, the sidewalls 130 can be characterized as having a curved profile. For example, as shown in FIG. 1A, the sidewalls are curved around the periphery of the internal cavity 150 so as to better conform to a shape and size of a portable electronic device that has beveled edges. In some embodiments, the sidewalls 130 include an angled edge 132 or lip that extends from an upper surface of at least one of the sidewalls 130. The angled edge 132 can extend from the upper surface of the sidewall 130 and extend in a direction towards the internal cavity 150 so that at least a portion of the angled edge 132 is parallel to the bottom wall 120. The sidewalls 130 can be coupled to a bottom wall 120 of the case 100. The bottom wall 120 can be substantially planar so as to correspond to a substantially planar surface of the portable electronic device. However, in some examples, the bottom wall 120 can include indentations, cavities, grooves, or other features provided along the surface of the bottom wall 120 that may cause the bottom wall 120 to have a non-planar cross-sectional profile.

In some embodiments, the case 100 includes securing elements 160 that are included along an interior surface of at least one sidewall 130. In some examples, the securing elements 160 can be provided along an internal surface of an angled edge 132 of the sidewall 130. In other examples, the securing elements 160 can be provided along a generally medial axis of the sidewall 130. In some examples, the securing elements 160 can be included on an interior surface of a corner portion 140. The corner portion 140 can refer to an edge of the case 100 that joins separate sidewalls 130 together. The securing elements 160 can be configured to increase an amount of friction or grip between the securing elements 160 of the case 100 and one or more surfaces of the portable electronic device, as described in more detail with reference to FIGS. 5A-5B. For example, the securing elements 160 can have a higher degree of coefficient than the sidewalls 130 or the corner portion 140. The securing elements 160 can be configured to prevent or minimize unintentional extraction of the portable electronic device from the internal cavity 150 when an external force is applied to the case 100, e.g., dropping the case 100 onto the floor. In some embodiments, the securing elements 160 can protrude from at least one of the internal surface of the sidewall 130 or the internal surface of the corner portion 140.

In some examples, the corner portion 140 can be configured to flex by a substantially different amount than the sidewalls 130. For example, the corner portion 140 can be comprised of different materials than the sidewalls 130 so that the corner portion 140 such that the corner portion 140 is characterized as having a different Young's modulus value or stretch ratio. In some examples, including the securing elements 160 along an internal surface of the corner portion 140 can render the corner portion 140 less flexible, more rigid, or more resistant to structural deformation than the sidewalls 130. In this manner, the corner portion 140 can be configured to provide a different amount of securing force against the portable electronic device than the sidewalls 130.

Figure 1B:
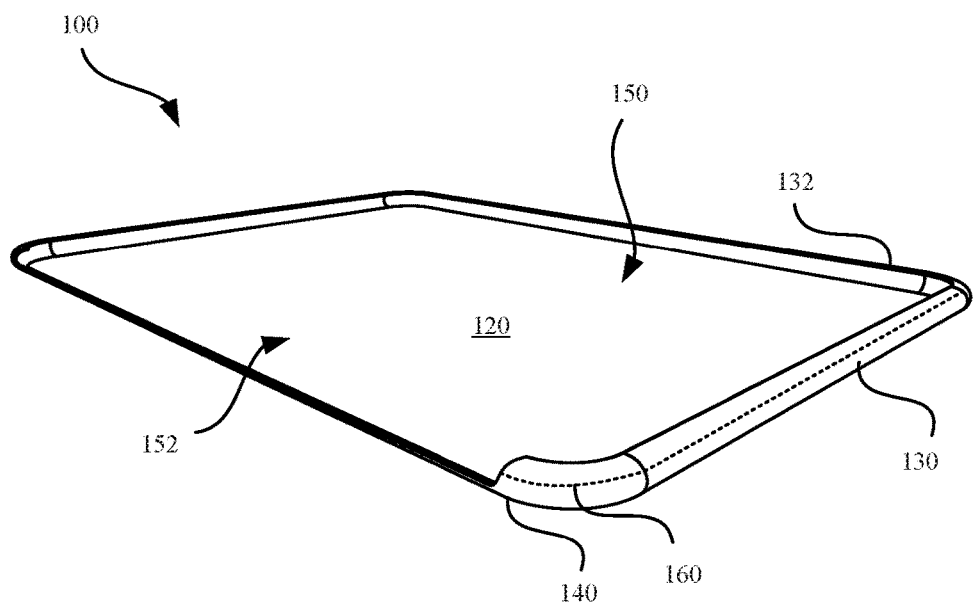

In contrast to the case 100 shown in FIG. 1A, the case 100 of FIG. 1B shows that the securing elements 160 can be included along an interior surface of at least one corner portion 140 and at least one sidewall 130.

Figure 1C:
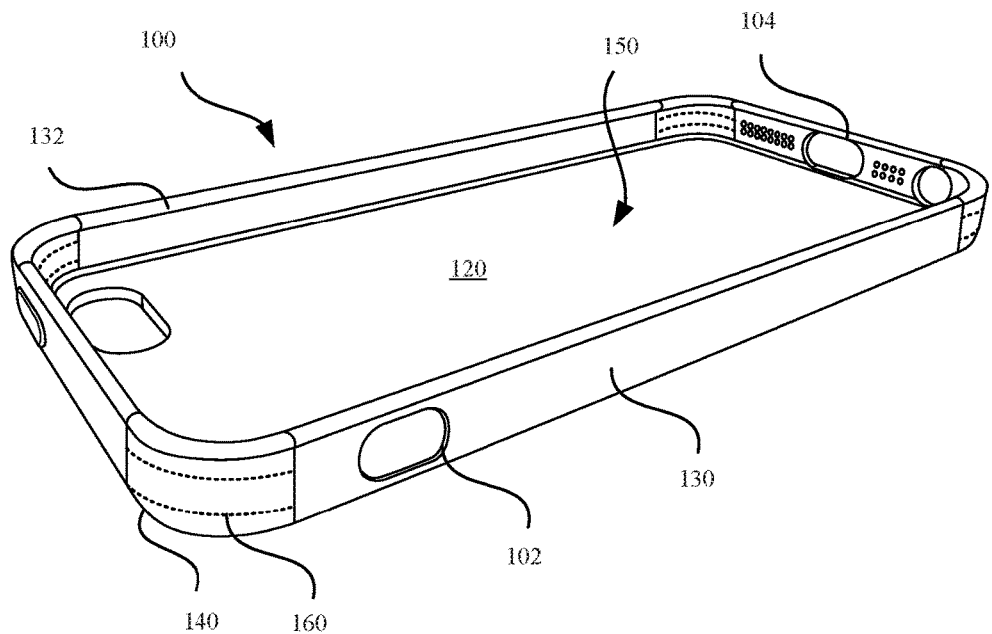

FIG. 1C illustrates a case 100 in accordance with some embodiments. FIG. 1C shows that the case 100 includes a plurality of electronic component openings 102, 104. The location of each of the electronic component openings 102, 104 along the case 100 can correspond to the location of an electronic component (e.g., switch, button, and toggle) of the portable electronic device so as to allow a user access to the electronic component while the portable electronic device is secured within the internal cavity 150 of the case 100.

In contrast to the case 100 shown in FIGS. 1A-1B, the case 100 of FIG. 1C is shown as having securing elements 160 that are included at interior surfaces of the corner portions 140 of the case 100. In some examples, the securing elements 160 of the case 100 of FIG. 1C can be manufactured from a material having a higher degree of flexibility, higher stretch ratio, or having a higher degree of friction coefficient than the materials utilized in the securing elements 160 shown in FIGS. 1A-1B. In some examples, the securing elements 160 shown in FIG. 1C can be manufactured from a larger amount of isoprene (i.e., natural rubber) than the securing elements 160 shown in FIGS. 1A-1B.

Figure 1D:
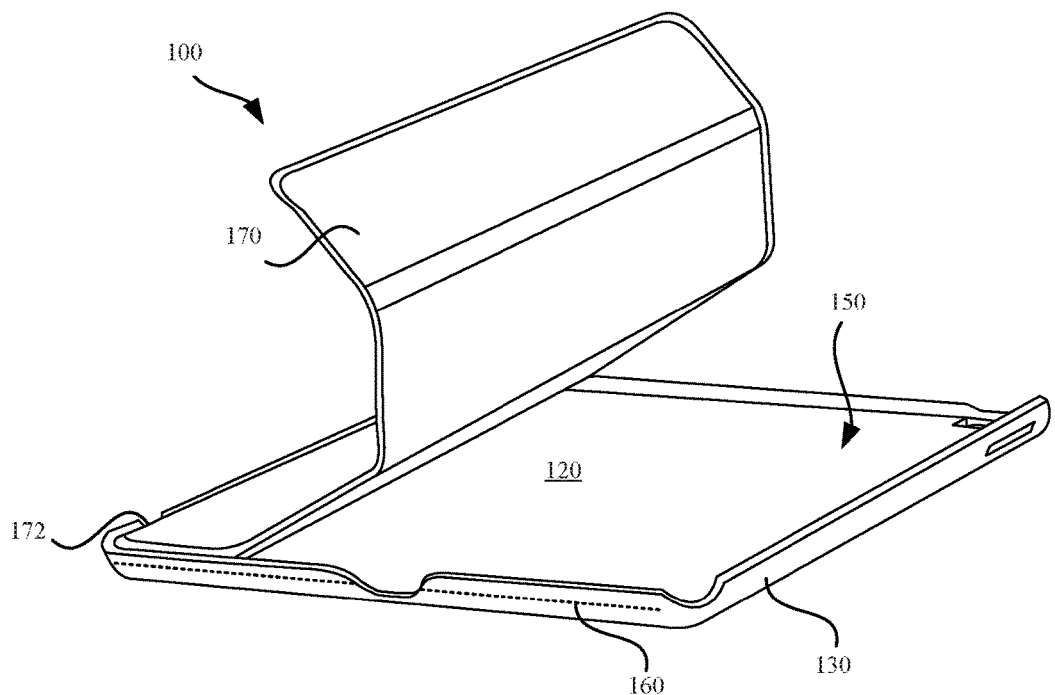

FIG. 1D illustrates a case 100 in accordance with some embodiments. FIG. 1D shows that the case 100 includes a foldable cover 170 that can be coupled to a sidewall 130 or attachment portion 172 of the case 100. The foldable cover 170 can be configured to transition between a folded configuration and planar configuration and intermediates thereof so as to provide protection for a display of the portable electronic device that is carried within the internal cavity 150. As shown in FIG. 1D, the case 100 includes securing elements 160 along an internal surface of the sidewall 130. Additionally, the foldable cover 170 can be configured to pivot or swing relative to the attachment portion 172 so as to adjust the amount of access to the internal cavity 150. In some examples, the foldable cover 170 can swing relative to the attachment portion 172 at an angle range between about 0 to about 360 degrees.

In some embodiments, the securing elements 160 protrude from the internal surface of the angled edge 132 of the sidewall 130 and/or the corner portion 140. In some examples, the securing elements 160 have a length e.g., between about 15 micrometers to about 20 micrometers. In some examples, the securing elements 160 have a length of e.g., between about 5 micrometers to about 500 micrometers. In some examples, the securing elements 160 are of sufficient length to flex relative to the sidewall 130 or corner portion 140, while not protruding from the internal surface at such a length so as to visibly ruin an appearance of the case 100. For example, the cosmetic appearance of the case 100 may suffer if the securing elements 160 are visible from a top view of the case 100. However, in other examples, the securing elements 160 can visibly protrude from the internal surface of the sidewall 130 or corner portion 140 so as to provide a distinctive look or feel for the case 100. For example, the securing elements 160 can provide different textures than the rest of the case 100. In some examples, the securing elements 160 can be color-matched to correspond to at least one of the sidewalls 130 or the corner portion 140.

In some examples, the securing elements 160 can refer to a suctioning element that can be configured to apply a negative amount of air pressure to the surface of the portable electronic device. As a suctioning element, the securing elements 160 can be made of an elastic, flexible material. In some examples, a central portion of the securing elements 160 can have a curved interface portion that contacts the surface of the portable electronic device and causes air to be expelled from the curved interface portion so that the securing elements 160 can be coupled to the surface of the portable electronic device.

In some embodiments, the securing elements 160 can be arranged in an ordered pattern that is tuned to have a configuration that prevents unintentional or forceful extraction of the portable electronic device from the internal cavity 150. For example, the securing elements 160 can be patterned to protect against forces associated with a high impact. In other embodiments, the securing elements 160 can be arranged in an ordered pattern that minimizes or eliminates forceful extraction of the portable electronic device from the internal cavity 150 of the case 100 when the case 100 is subjected to a continuous, but low amount of force (e.g., dragging a surface of the case 100 against a surface with a high coefficient of friction, such as wood).

In some embodiments, the securing elements 160 can be configured to flex, deform, or compress in order to dissipate the energy associated with the external force that is applied to the case 100. In some example, the securing elements 160 can be arranged in a configuration that can facilitate in dispersing or translating the energy associated with the force applied to the case away from a vulnerable region of the case 100 (e.g., the opening 152). As the one or more regions of the case 100 proximate to the opening 152 may have the greatest amount of flex or deformity, the securing elements 160 can dissipate the energy away from these one or more regions to prevent the forceful extraction of the portable electronic device from the case 100.

Figure 2A:
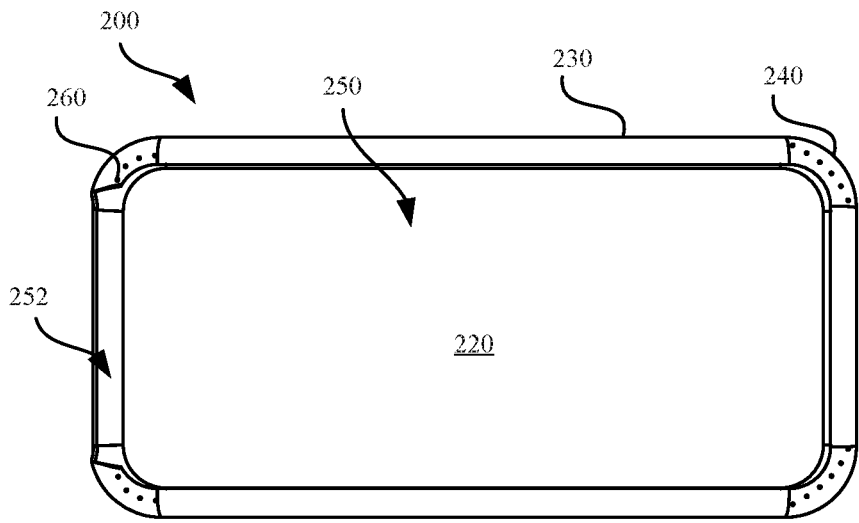
FIGS. 2A-2B illustrate top views of various embodiments of a case for a portable electronic device.
Figure 2B:
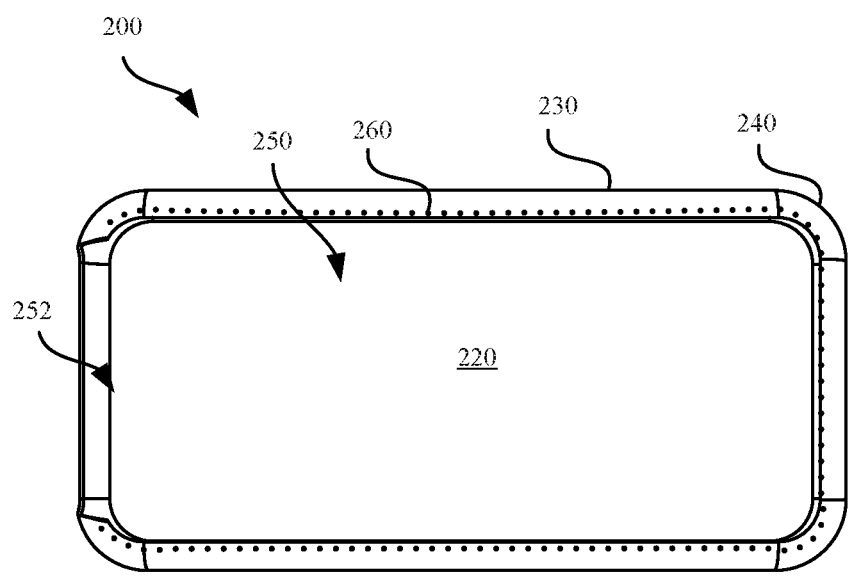

FIGS. 2A-2B illustrate top views of various embodiments of a case 200 for retaining the portable electronic device. FIG. 2A illustrates a top view of a case 200 that includes securing elements 260, in accordance with some embodiments. FIG. 2A illustrates that the case 200 including sidewalls 230 that are joined by a corner portion 240 of the case 200. The sidewalls 230 are coupled to a bottom wall 220 so as to define an internal cavity 250. The case 200 includes an opening 252 to facilitate access to the internal cavity 250. For example, the sidewalls 230 can be flexed to increase the opening 252 to the internal cavity 250. FIG. 2A also shows that securing elements 260 are included on internal surfaces of the corner portion 240 of the case 200.

FIG. 2B illustrates a top view of the case 200 including sidewalls 230 that are joined by a corner portion 240 of the case 200. As shown in FIG. 2B, the securing elements 260 are included along internal surfaces of both the corner portions 240 and the sidewalls 230.

Figure 3A:
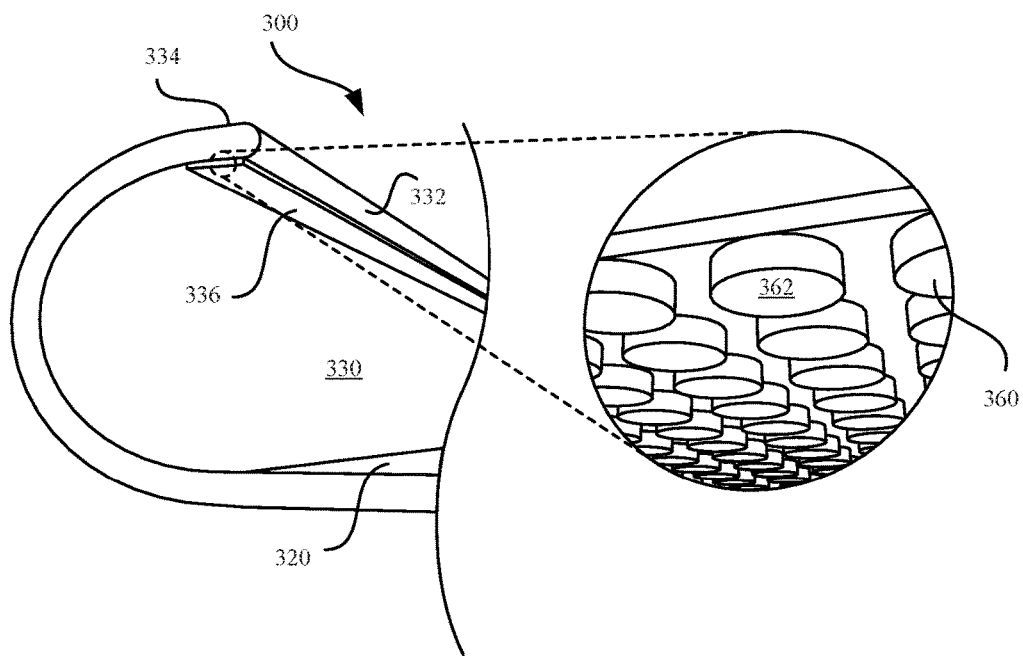
FIGS. 3A-3D illustrate perspective views of various embodiments of a case for a portable electronic device.

FIGS. 3A-3D illustrate perspective views of a case 300 that includes securing elements 360, in accordance with various embodiments. FIG. 3A illustrates a case 300 that includes a bottom wall 320 that is coupled to sidewalls 330. In some examples, the sidewalls 330 can be integrally formed with the bottom wall 320 during a shaping or molding operation. In some examples, the sidewalls 330 have substantially curved profiles so as to conform to a shape and size of the beveled edges of the portable electronic device. In some embodiments, at least one sidewall 330 includes an angled edge 332. The angled edge 332 can be integrally formed with the sidewall 330. In some embodiments, the angled edge 332 includes an upper surface 334 and an internal surface 336. The internal surface 336 can be concealed from a top view of the case 300, and the internal surface 336 can include securing elements 360 that are arranged in a tuned configuration that is optimized to prevent unintentional extraction of the portable electronic device from an internal cavity 150 of the case 100.

As shown in FIG. 3A, the securing elements 360 can extend from the internal surface 336 of the angled edge 332. The securing elements 360 can include a contact surface 362 that can be configured to grip or contact with a surface of the portable electronic device. In some examples, the contact surface 362 can be configured to grip onto one or more surfaces of the portable electronic device, including edges, display, cover glass, lateral surfaces, and the like. As shown in FIG. 3A, the contact surface 362 can be characterized as being substantially elliptical or circular. FIG. 3A illustrates that the tuned pattern shown in FIG. 3A allows for each of the securing elements 360 to individually grip and flex with a portion of a surface of the portable electronic device, as each of the securing elements 360 are isolated from one another.

In some embodiments, the upper surface 334 of the angled edge 332 can correspond to a viewing surface. For example, the angled edge 332 prevents the internal surface 336 from being seen from a top view of the case 300. Thus, the angled edge 332 minimizes a reduction in the appearance of the case 300 by concealing the securing elements 360 from the observer.

In some embodiments, when the portable electronic device is inserted within an internal cavity 150 of the case 300, the portable electronic device can also prevent the internal surface 336 and the securing elements 360 of the angled edge 332 from being seen.

Figure 3B:
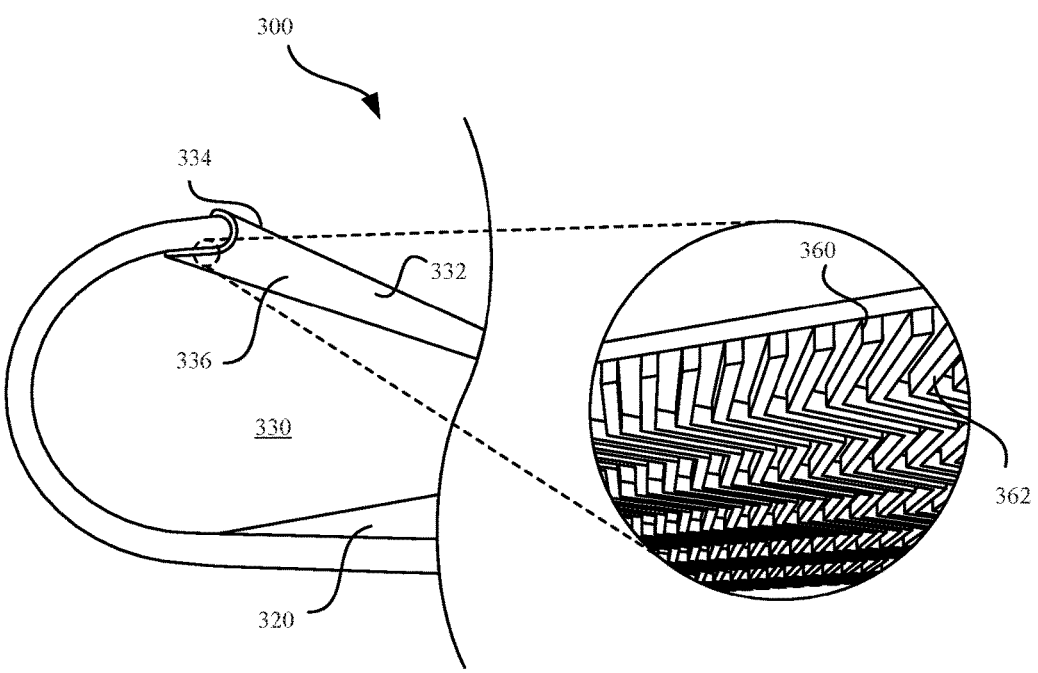

FIG. 3B illustrates a perspective view of the case 300, in accordance with some embodiments. In contrast to FIG. 3A, the case 300 of FIG. 3B includes securing elements 360 that have a contact surface 362 that can be characterized as being substantially rectangular or polygonal. The securing elements 360 of FIG. 3B have a smaller contact area than the securing elements 360 of FIG. 3A. However, in this configuration permits for a greater number of securing elements 360 to be included along the internal surface 336 of the angled edge 332. Additionally, FIG. 3B shows that adjacent securing elements 360 are coupled to each other such that each securing element 360 is not entirely capable of individually flexing without interference from another securing element 360.

Figure 3C:
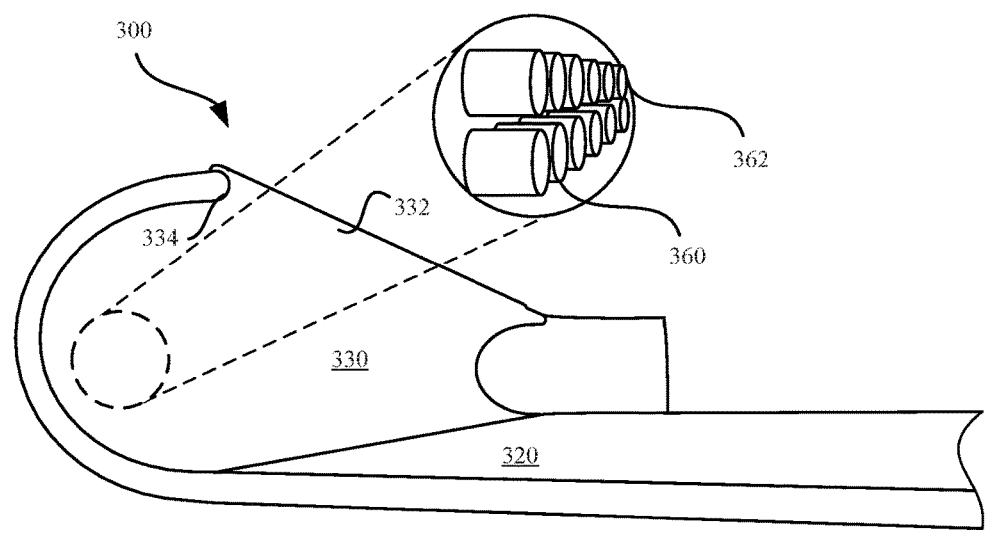

FIG. 3C illustrates a perspective view of a case 300 that includes securing elements 360 in accordance with various embodiments. The case 300 includes sidewalls 330 that extend from the bottom wall 320. In some embodiments, at least one sidewall 330 includes an upper portion having an angled edge 332. In contrast to the case 300 shown in FIGS. 3A-3B, the case 300 of FIG. 3C includes securing elements 360 that can be outside of the angled edge 332, such as along the medial axis of the sidewall 330. FIG. 3C shows that the sidewalls 330 are generally curved. In FIG. 3C, the presence of securing elements 360 along the sidewalls 330 and the internal surface 336 of the angled edge 332 can increase an amount of grip or contact between the case 300 and the portable electronic device. For example, securing elements 360 along the internal surface 336 of the angled edge 332 as well as elsewhere along the sidewall 330 can provide grip to a cover glass and edges of the portable electronic device.

Figure 3D:
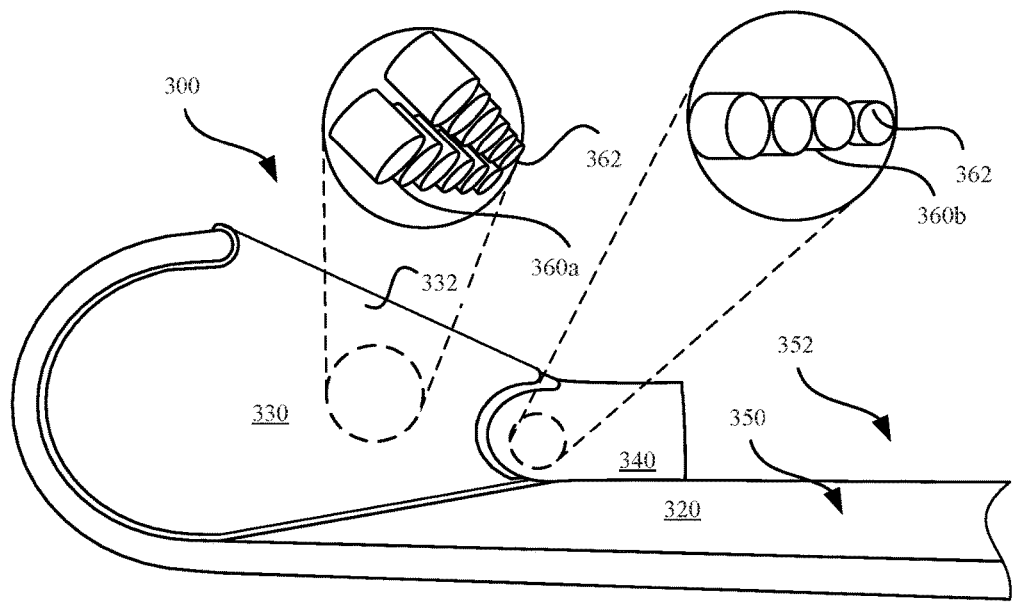

FIG. 3D illustrates a case 300 that includes securing elements 360a that are included on the internal surface of the sidewall 330, in accordance with some embodiments. In some embodiments, the securing elements 360a included on the sidewall 330 can be angled or directed towards the internal cavity 350 so that there is increased contact between the contact surface 362 and a surface of the portable electronic device. Furthermore, FIG. 3D illustrates that at least one corner portion 340 of the case 300 includes securing elements 360b. The sidewalls 330, the corner portion 340, and the bottom wall 320 can define an opening 352 to the internal cavity 350.

In some embodiments, the securing elements 360a included on the sidewall 330 can be substantially similar to the securing elements 360b included on the corner portion 340 with regarding to a configuration, such as shape, size, length, dimensions, density, and the like. In some embodiments, the securing elements 360a and 360b can be distinct with regard to their respective configurations.

Although not shown in FIGS. 3A-3D, the securing elements 360 in any region of the case 100 can have varying lengths or sizes. For example, adjacent securing elements 360 can have different lengths or different shape and size of a contact surface 362.

Figure 4A:
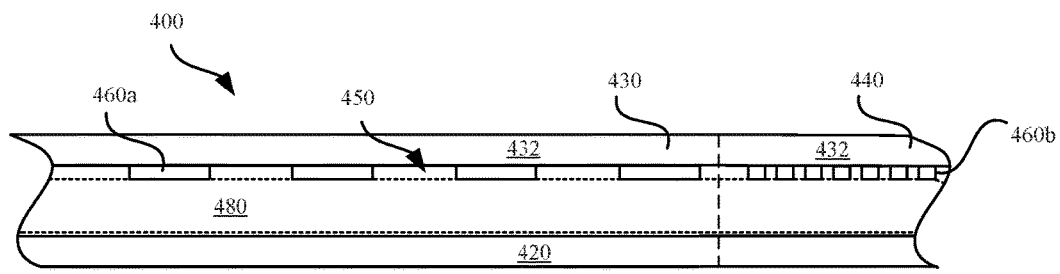
FIGS. 4A-4D illustrate cross-sectional views of various embodiments of a case for a portable electronic device.

FIGS. 4A-4D illustrate cross-sectional views of a case 400 for securing a portable electronic device 480, in accordance with some embodiments. FIG. 4A illustrates a cross-sectional view of the case 400 that includes a sidewall 430 having an angled edge 432 that extends from an upper surface of the sidewall 430. A lower or internal surface of the angled edge 432 includes a first set of securing elements 460a that are arranged in a first tuned configuration to prevent inadvertent extraction of the portable electronic device 480 when the case 400 is subject to a forceful impact. The sidewall 430 and the bottom wall 420 can define an internal cavity 450 that has a size and shape that corresponds to the portable electronic device 480.

FIG. 4A further shows that the sidewall 430 is joined with a corner portion 440. In some examples, the sidewall 430 and the corner portion 440 can be integrally formed together, such as through an injection molding operation. In other examples, the sidewall 430 and the corner portion 440 can be separately formed, and then subsequently joined together. FIG. 4A shows that the angled edge 432 can extend through the sidewall 430 and the corner portion 440. The angled edge 432 of the corner portion 440 can include a second set of securing elements 460b that are arranged in a second tuned configuration. In some examples, the second set of securing elements 460a differ from the first set of securing elements 460b according to at least one of length, shape, size, distance, width, density, surface area, contact surface area shape, and the like. In this manner, the first set of securing elements 460a associated with the first tuned configuration can have a different textured pattern than the second set of securing elements 460b associated with the second tuned configuration. For example, each of the securing elements 460b in the corner portion 440 can individually flex in at least one or more directions so as to maintain grip with the surface of the portable electronic device 480 when a force is applied to the case 400.

Figure 4B:
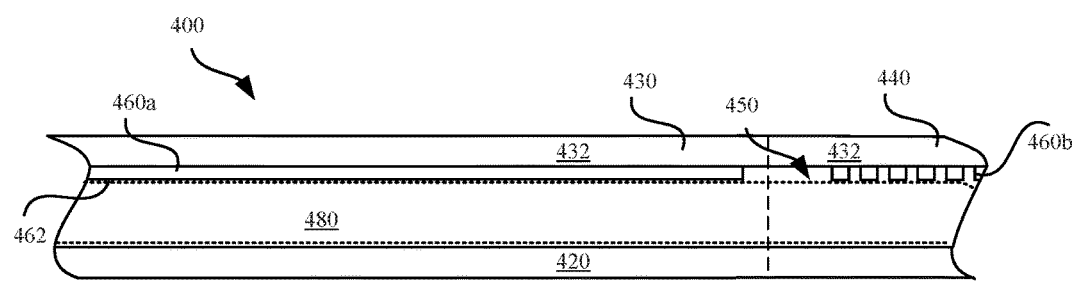

FIG. 4B illustrates a cross-sectional view of the case 400 that includes a sidewall 430 having an angled edge 432. The case 400 shown in FIG. 4B is similar in some respects to the case 400 shown in FIG. 4A, but for the single securing element 460a that is provided along an internal surface of the angled edge 432. In some examples, the single securing element 460a includes a single contact area 462 having a substantially planar contact surface that corresponds to a planar surface of the portable electronic device 480. By utilizing a single securing element 460a, the sidewall 430 can increase the amount of contact area between the case 400 and the portable electronic device 480.

Figure 4C:
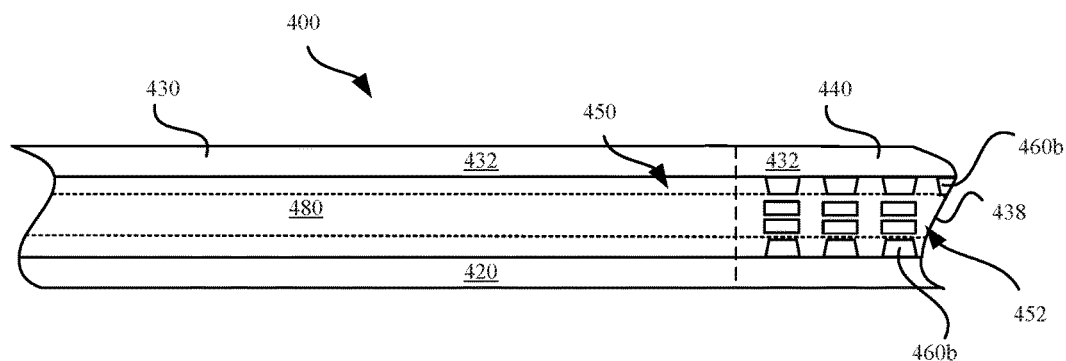

FIG. 4C illustrates a cross-sectional view of the case 400 that includes a sidewall 430 having an angled edge 432. In contrast to the case 400 shown in FIGS. 4A-4B, the case 400 of FIG. 4C does not include a securing element along the angled edge 432. Instead the securing elements 460b are only included along the internal surface 438 of the corner portion 440. In some examples, the opening 452 of the case 400 can prove susceptible to unintentionally flexing to allow the portable electronic device 480 to become extracted. In some embodiments, the securing elements 460b can be included along substantially the majority of or the entirety of the internal surface 438 of the corner portion 440.

Figure 4D:
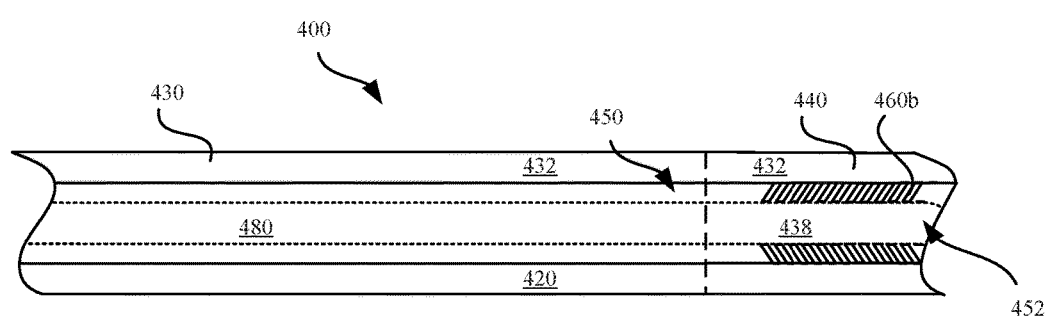

FIG. 4D illustrates a cross-sectional view of the case 400, in accordance with some embodiments. In contrast to the case 400 shown in FIGS. 4A-4C, the case 400 of FIG. 4D shows that the securing elements 460b are oriented or angled in a directional manner in an initial configuration (i.e., no force or load is applied to the case 400) away from the opening 452. In this manner, when a force or load is applied to the case 400, the securing elements 460b can be configured to grip the surface of the portable electronic device 480 sufficiently to direct the motion of the portable electronic device 480 away from the opening 452.

Figure 5A:
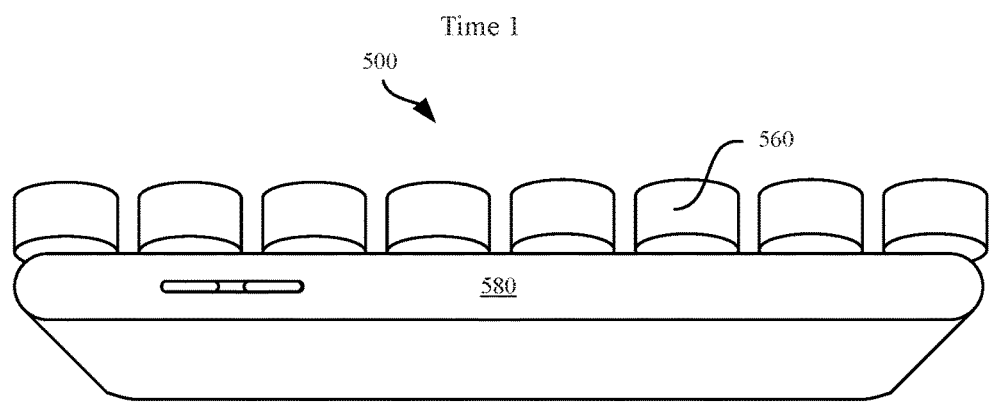
FIGS. 5A-5B illustrate perspective views of securing elements during an initial configuration and a modified configuration, in accordance with some embodiments.
Figure 5B:
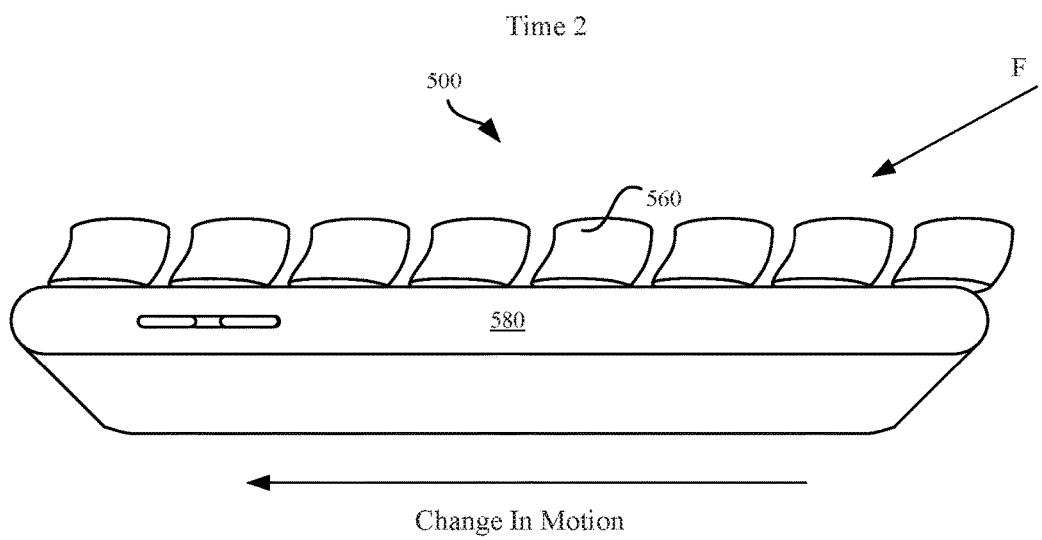

FIGS. 5A-5B illustrate perspective views of the securing elements 560 of the case 500 during an initial configuration and a modified configuration, respectively, in accordance with some embodiments.

FIG. 5A illustrates the case 500 in conjunction with the initial configuration during Time 1, where there is an absence of a force that is externally applied to the case 500. As shown in FIG. 5A, the securing elements 560 are in contact with one or more surfaces of the portable electronic device 580.

FIG. 5B illustrates the case 500 in conjunction with the modified configuration during Time 2, where a force is externally applied to the case 500. The one or more contact surfaces 562 of the securing elements 560 are configured to maintain contact or grip with the surface of the portable electronic device 580 despite the change in motion of the portable electronic device 580 relative to the case 500. The securing elements 560 can be configured to maintain contact or grip with the surface of the portable electronic device 580 by flexing in a direction that corresponds to the direction of the externally applied force.

In some embodiments, after the application of the external force to the case 500, the securing elements 560 can be configured to rebound or revert back to their initial configuration. In this manner, the portable electronic device 580 can be retained within the internal cavity 550 of the case 500. Since the securing elements 560 maintain grip with the surface of the portable electronic device 580, the securing elements 560 can prevent extraction of the portable electronic device 580 via an opening 152 of the case 100.

Figure 6:
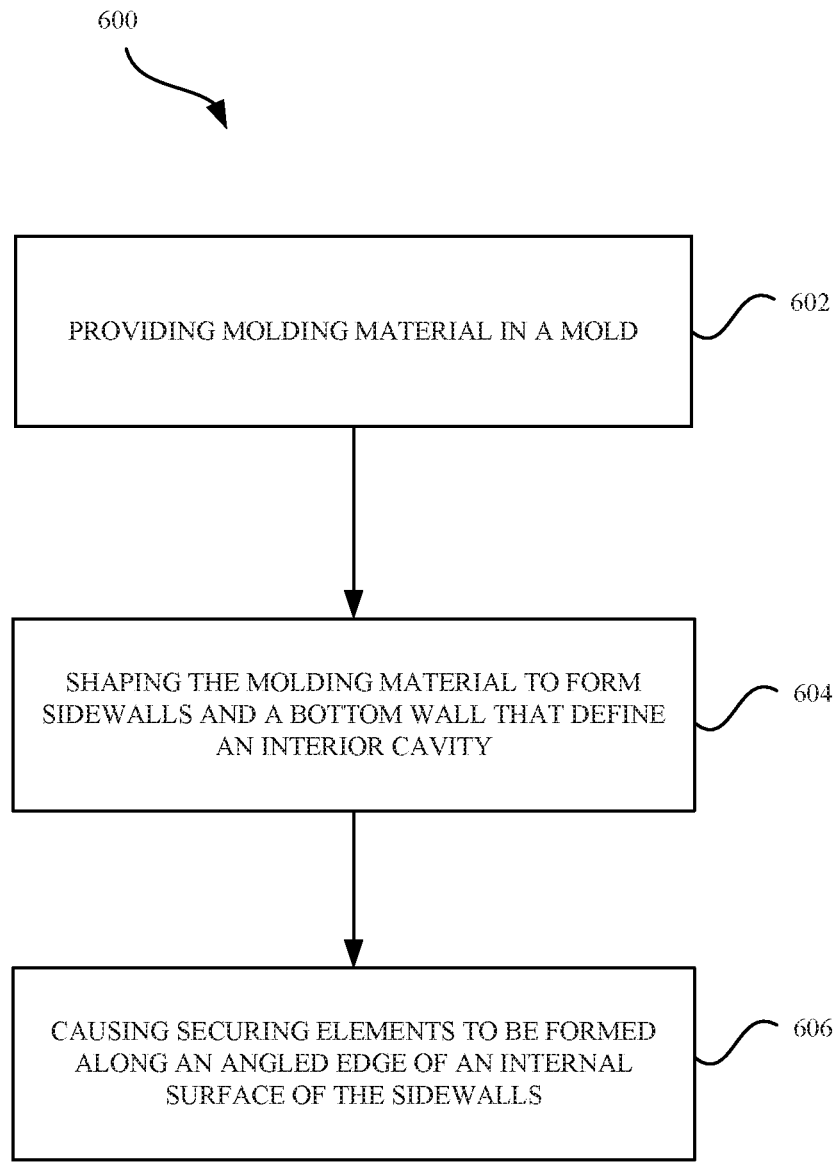
FIG. 6 illustrates a method for forming a case for a portable electronic device, in accordance with some embodiments.

FIG. 6 illustrates a method 600 for forming various embodiments of a case for an electronic device, as described herein. As shown in FIG. 6, the method 600 begins at step 602 where a molding material is provided in a mold. The mold can have an outline of the various embodiments of the cases described herein. By way of example, FIG. 6 is directed towards forming the case 300 (e.g., molded shell), although other embodiments of the case can also be formed through the described techniques.

At step 604, the molding material is shaped in the mold to create the case 300 having a bottom wall 320 and sidewalls 330 joined or coupled to the bottom wall 320 to define an internal cavity 350. In some examples, the molding material can be shaped via a vacuum pressure operation, a gravity pull operation, a pressurized gas, and the like. In some examples, the molding material is comprised of at least one of silicone, polyurethane, elastomers, polyester, or other moldable material.

At step 606, securing elements 360 are formed along an angled edge 332 of an internal surface 336 of the sidewalls 330. The securing elements 360 can protrude from the internal surface 336. In some examples, the securing elements 360 are integrally formed with the sidewalls 330 and the bottom wall 320 from the same molding material.

Figure 7:
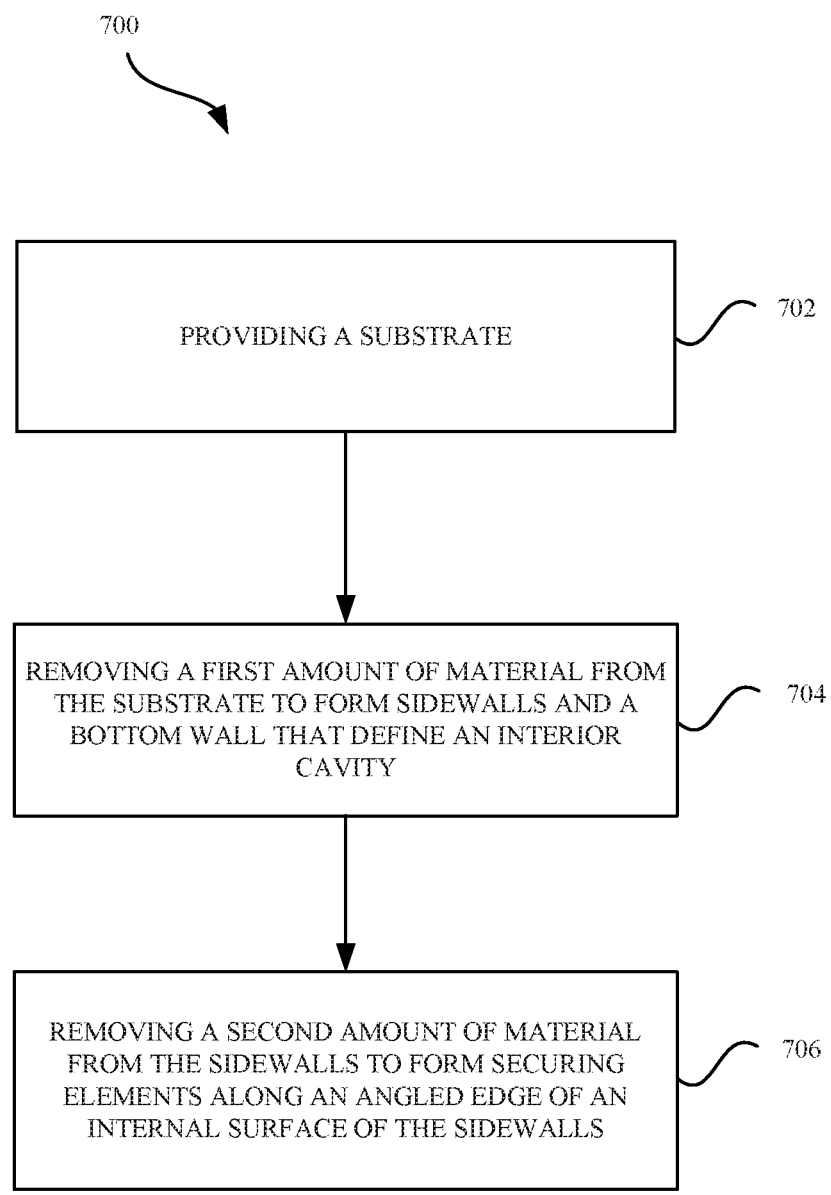
FIG. 7 illustrates a method for forming a case for a portable electronic device, in accordance with some embodiments.

FIG. 7 illustrates a method 700 for forming various embodiments of a case for an electronic device, as described herein. By way of example, FIG. 7 is directed towards forming the case 300 (e.g., molded shell), although other embodiments of the case can also be formed through the described techniques. As shown in FIG. 7, the method 700 begins at step 702 where a substrate is provided. At step 704, a shaping device (e.g., laser device, cutting device, etc.) can remove a first amount of material from the substrate to form a bottom wall 320 and sidewalls 330 coupled or joined to the bottom wall 320 to define an internal cavity 350. In some examples, the substrate is comprised of at least one of silicone, polyurethane, elastomers, polyester, or a moldable material.

At step 706, the shaping device can remove a second amount of material from the sidewalls 330 to form securing elements 360 along an angled edge 332 of an internal surface 336 of the sidewalls for forming the case for the electronic device. The securing elements 360 can protrude from the internal surface 336.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A case for a portable electronic device, the case comprising:
    a bottom wall and side walls that cooperate to define a cavity having a size and shape suitable for accommodating the portable electronic device, wherein the side walls terminate at a first edge that extends from the side walls at a first angle, and the first edge defines an opening that leads to the cavity and that allows passage of the portable electronic device into the cavity; and
    a securing element that (i) extends from at least one of the side walls and towards the cavity at a second angle and terminates at a second edge different than the first edge, and (ii) is overlaid by the first edge, wherein the second edge of the securing element is capable of contacting an external surface of the portable electronic device carried within the cavity such as to hinder movement of the portable electronic device out of the cavity.

2. The case of claim 1, wherein the securing element originates from an internal surface of the at least one side wall, and the at least one side wall has an inwardly curved cross section.

3. The case of claim 1, wherein two of the side walls are joined by a corner portion.

4. The case of claim 1, wherein the case is formed of any combination of silicone, polyurethane or polyester.

5. The case of claim 1, wherein an upper surface of the first edge is visible from an environment external to the case, and the upper surface also prevents the securing element from being visible from the environment external to the case.

6. The case of claim 1, wherein the first angle is different from the second angle.

7. The case of claim 1, wherein the securing element is a portion of a textured region of the side walls, the textured region having a different texture than the first and second edges.

8. The case of claim 1, wherein when an external force is applied to the side walls, the securing element flexes in such a way so as to hinder the movement of the portable electronic device that is carried within the cavity.

9. A shell for retaining a portable electronic device, the shell comprising:
    a bottom wall and side walls that extend from the bottom wall at a first angle relative to the bottom wall, and the side walls cooperate to define a cavity with a width that is capable of accommodating the portable electronic device, wherein each of the side walls has an undercut cross section such that an upper edge of the side wall (i) is visible from an environment external to the bottom wall and the side walls, and (ii) defines an opening that leads to the cavity, and wherein the opening is less than the width of the cavity; and
    securing elements that protrude from an interior surface of at least one of the side walls in a direction towards the bottom wall and at a second angle different than the first angle, wherein each of the securing elements is arranged to independently flex at different angles relative to each other such as to hinder movement of the portable electronic device out of the cavity when the securing elements are engaged with an exterior surface of the portable electronic device carried within the cavity, and wherein the undercut cross section prevents the securing elements from being visible from the external environment.

10. The shell of claim 9, wherein two of the side walls are joined by a corner portion, and the corner portion includes an additional securing element that extends towards the bottom wall.

11. The shell of claim 10, wherein the upper edge overlays the securing elements such as to prevent the securing elements from being visible from the external environment.

12. The shell of claim 11, wherein the additional securing element of the corner portion has a shape and size that is different from the securing elements.

13. The shell of claim 9, wherein the shell is formed of any combination of silicone, polyurethane or polyester.

14. The shell of claim 9, wherein the securing elements are integrally formed with the side walls.

15. The shell of claim 9, wherein when an external force is applied to the shell, the securing elements flex in such a way so that the securing elements continue to remain engaged to the exterior surface of the portable electronic device, thereby hindering movement of the portable electronic device out of the cavity.

16. The shell of claim 15, wherein the securing elements are formed of a material having a higher coefficient of friction than a material of the side walls.

17. A method for forming a case for an electronic device, the method comprising:
    shaping a substrate to form a bottom wall and side walls that extend from the bottom wall at a first angle relative to the bottom wall, wherein the side walls terminate at a first edge that extends from the side walls at a first angle, and the first edge defines an opening that leads to a cavity having a size and shape suitable for accommodating the electronic device; and
    forming a securing element that extends from at least one of the side walls and towards the cavity at a second angle, wherein the securing element terminates at a second edge different than the first edge, and the securing element is overlaid by the first edge, and wherein the second edge of the securing element is capable of contacting an external surface of the electronic device so as to (i) allow insertion of the electronic device through the opening and into the cavity, and (ii) prevent movement of the electronic device out of the cavity.

18. The method of claim 17, wherein the substrate is shaped by a molding operation or a material removal operation.

19. The method of claim 18, wherein the securing element is integrally formed with the side walls.

20. The method of claim 17, wherein the case is formed of any combination of silicone, polyurethane, or polyester.

* * * * *